United States Patent
Parmar et al.

(10) Patent No.: US 12,450,346 B2
(45) Date of Patent: Oct. 21, 2025

(54) MALWARE BEACON DETECTION SYSTEM

(71) Applicant: BULL SAS, Les Clayes-sous-Bois (FR)

(72) Inventors: Harshvardhan Parmar, Herndon, VA (US); Vinod Vasudevan, Fairfax, VA (US)

(73) Assignee: BULL SAS, Les Clayes-sous-Bois (FR)

( * ) Notice: Subject to any disclaimer, the term of this patent is extended or adjusted under 35 U.S.C. 154(b) by 265 days.

(21) Appl. No.: 18/344,803

(22) Filed: Jun. 29, 2023

(65) Prior Publication Data

US 2025/0005151 A1    Jan. 2, 2025

(51) Int. Cl.
*H04L 9/40* (2022.01)
*G06F 21/56* (2013.01)

(52) U.S. Cl.
CPC ........ *G06F 21/561* (2013.01); *H04L 63/1416* (2013.01); *H04L 63/1425* (2013.01); *H04L 2463/144* (2013.01)

(58) Field of Classification Search
CPC .... G06F 21/561; G06F 21/552; G06F 21/554; H04L 63/1425; H04L 63/145; H04L 63/1416; H04L 2463/144
See application file for complete search history.

(56) References Cited

U.S. PATENT DOCUMENTS 8,578,493 B1 * 11/2013 Cowan ................. G06F 21/554
                                                            709/224
9,038,178 B1 *  5/2015 Lin ..................... H04L 63/1425
                                                            713/153

(Continued)

FOREIGN PATENT DOCUMENTS

CN    113114671 A   *  7/2021   ........... G06F 16/906
CN    114422207 A   *  4/2022

OTHER PUBLICATIONS

Y.-R. Yeh, T. C. Tu, M.-K. Sun, S. M. Pi and C . . . -Y. Huang, "A Malware Beacon of Botnet by Local Periodic Communication Behavior," 2018 IEEE 42nd Annual Computer Software and Applications Conference (COMPSAC), Tokyo, Japan, 2018, pp. 653-657 (Year: 2018).*

(Continued)

*Primary Examiner* — Zhimei Zhu
(74) *Attorney, Agent, or Firm* — ARC IP Law, PC; Joseph J. Mayo

(57) ABSTRACT

A system that detects malware by analyzing message logs to identify message patterns that are periodic with similar-sized messages. These patterns may indicate malware since malware often sends beacon messages to a command-and-control system that are often periodic and of relatively similar length. The system may group message logs by the combination of source and destination and analyze each group for patterns of periodicity and message length uniformity. Entropy may be used to measure the uniformity of message lengths and message intervals, with low (or zero) entropy suggesting malware. Message intervals that repeat after several messages may be detected by testing subsequence sums for uniformity at different possible periods. Additional factors may be used to assess the risk, such as the duration of communication, and threat intelligence on the source or destination. The system may perform automated actions to eliminate or mitigate detected risks, such as blocking further communication.

15 Claims, 10 Drawing Sheets

(56) References Cited

U.S. PATENT DOCUMENTS

| | | | | |
|---|---|---|---|---|
| 9,380,066 | B2* | 6/2016 | Hohndel | G06N 3/126 |
| 10,284,584 | B2* | 5/2019 | Hu | G06F 21/552 |
| 10,757,136 | B2* | 8/2020 | Fridman | H04L 63/1458 |
| 12,088,611 | B1* | 9/2024 | Lin | H04L 63/20 |
| 12,199,997 | B1* | 1/2025 | Lin | H04L 41/22 |
| 12,323,389 | B2* | 6/2025 | Jia | H04L 63/0236 |
| 2014/0344935 | A1* | 11/2014 | Duan | H04L 63/1408 |
| | | | | 726/24 |
| 2016/0014147 | A1* | 1/2016 | Zoldi | H04L 61/4511 |
| | | | | 726/23 |
| 2017/0063921 | A1* | 3/2017 | Fridman | H04L 63/1466 |
| 2017/0244731 | A1* | 8/2017 | Hu | H04L 63/1425 |
| 2019/0020663 | A1* | 1/2019 | Bartos | H04L 43/08 |
| 2020/0014707 | A1* | 1/2020 | Xie | H04L 63/1425 |
| 2020/0304522 | A1* | 9/2020 | Singh | G06Q 10/10 |
| 2021/0360015 | A1* | 11/2021 | Mammadli | H04L 63/1466 |
| 2024/0039893 | A1* | 2/2024 | Jia | H04L 63/1425 |
| 2024/0039952 | A1* | 2/2024 | Jia | H04L 63/0236 |

OTHER PUBLICATIONS

X. Hu et al., "BAYWATCH: Robust Beaconing Detection to Identify Infected Hosts in Large-Scale Enterprise Networks," 2016 46th Annual IEEE/IFIP International Conference on Dependable Systems and Networks (DSN), Toulouse, France, 2016, pp. 479-490 (Year: 2016).*

European Search Report and Written Opinion issued in EP24181430. 0, dated Nov. 20, 2024, and English translations thereof.

* cited by examiner

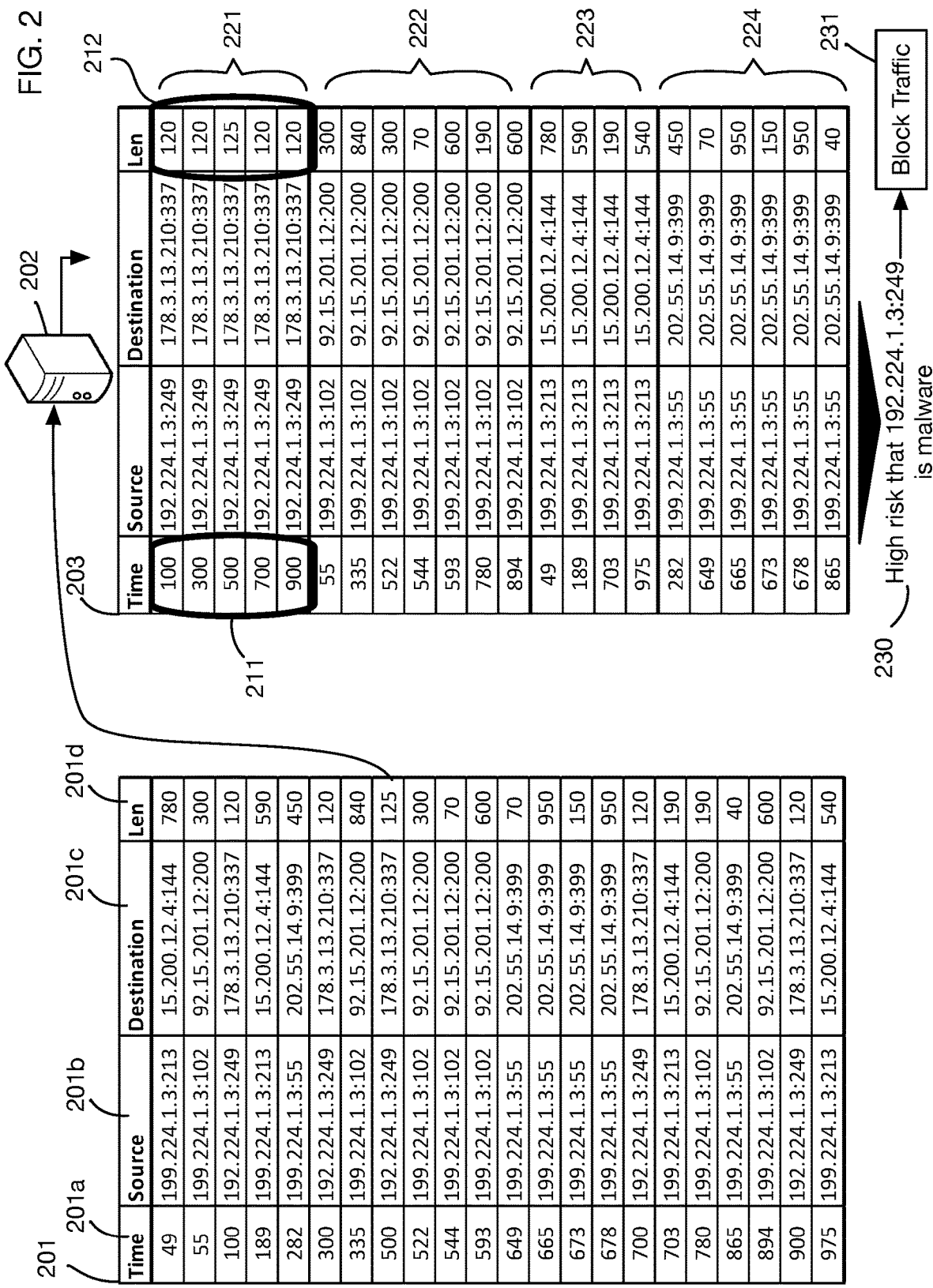

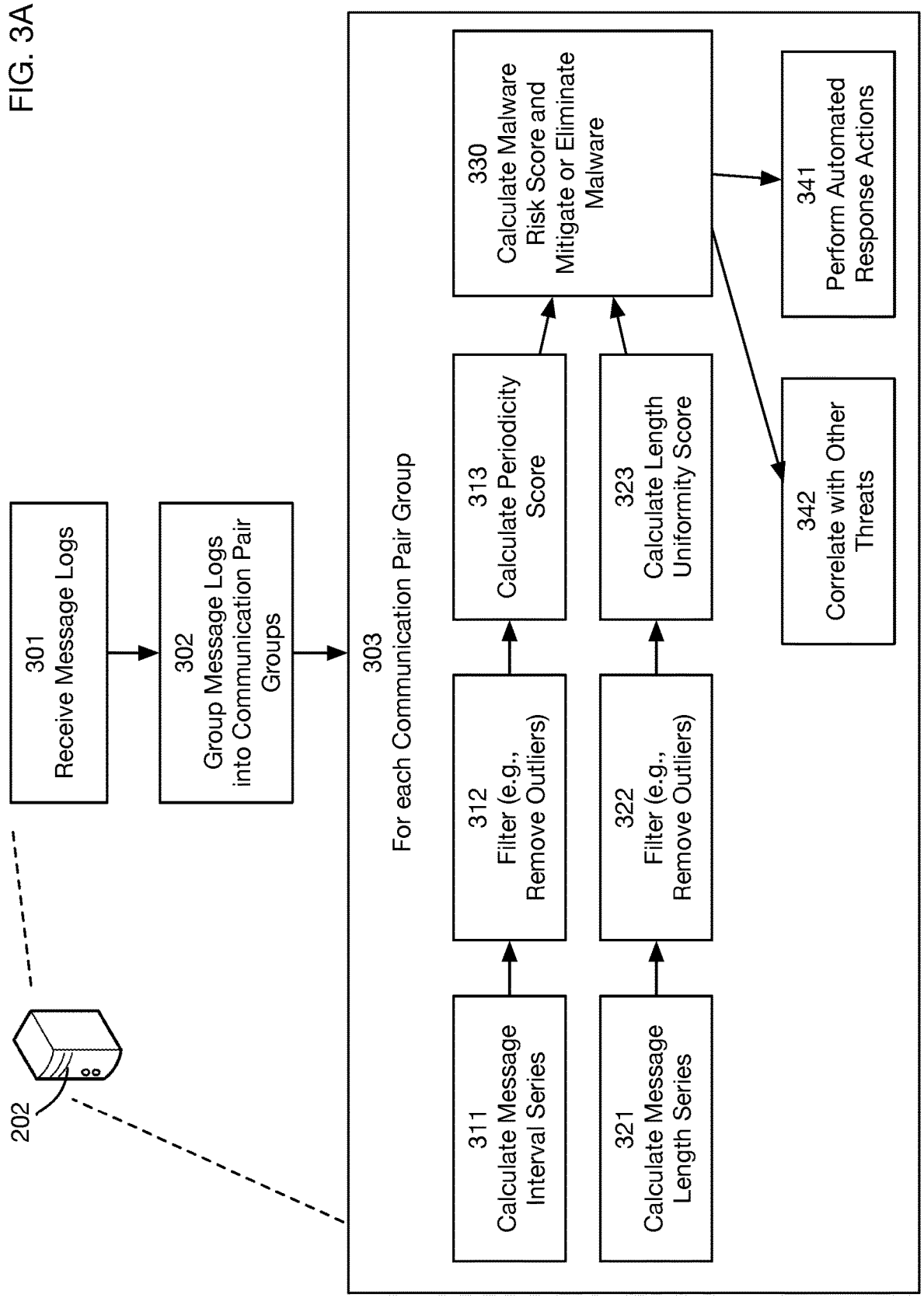

FIG. 4

| Time | Source | Destination | Len | Δtime |
|---|---|---|---|---|
| 100 | 192.224.1.3:249 | 178.3.13.210:337 | 120 | |
| 300 | 192.224.1.3:249 | 178.3.13.210:337 | 120 | 200 |
| 500 | 192.224.1.3:249 | 178.3.13.210:337 | 125 | 200 |
| 700 | 192.224.1.3:249 | 178.3.13.210:337 | 120 | 200 |
| 900 | 192.224.1.3:249 | 178.3.13.210:337 | 120 | 200 |
| 55 | 199.224.1.3:102 | 92.15.201.12:200 | 300 | |
| 335 | 199.224.1.3:102 | 92.15.201.12:200 | 840 | 280 |
| 522 | 199.224.1.3:102 | 92.15.201.12:200 | 300 | 187 |
| 544 | 199.224.1.3:102 | 92.15.201.12:200 | 70 | 22 |
| 593 | 199.224.1.3:102 | 92.15.201.12:200 | 600 | 49 |
| 780 | 199.224.1.3:102 | 92.15.201.12:200 | 190 | 187 |
| 894 | 199.224.1.3:102 | 92.15.201.12:200 | 600 | 114 |
| 49 | 199.224.1.3:213 | 15.200.12.4:144 | 780 | |
| 189 | 199.224.1.3:213 | 15.200.12.4:144 | 590 | 140 |
| 703 | 199.224.1.3:213 | 15.200.12.4:144 | 190 | 514 |
| 975 | 199.224.1.3:213 | 15.200.12.4:144 | 540 | 272 |
| 282 | 199.224.1.3:55 | 202.55.14.9:399 | 450 | |
| 649 | 199.224.1.3:55 | 202.55.14.9:399 | 70 | 367 |
| 665 | 199.224.1.3:55 | 202.55.14.9:399 | 950 | 16 |
| 673 | 199.224.1.3:55 | 202.55.14.9:399 | 150 | 8 |
| 678 | 199.224.1.3:55 | 202.55.14.9:399 | 950 | 5 |
| 865 | 199.224.1.3:55 | 202.55.14.9:399 | 40 | 187 |

(192.224.1.3:249, 178.3.13.210:337) — 411
- Length series: (120,120,125,120,120) — 412
- Interval series: (200,200,200,200) — 413

(199.224.1.3:102, 92.15.201.12:200) — 421
- Length series: (300,840,300,70,600,190,600) — 422
- Interval series: (280,187,22,49,187,114) — 423

(199.224.1.3:213, 15.200.12.4:144) — 431
- Length series: (780,590,190,540)
- Interval series: (140,514,272)

(199.224.1.3:213, 15.200.12.4:144) — 441
- Length series: (450,70,950,150,950,40)
- Interval series: (367,16,8,5,187)

MALWARE BEACON DETECTION SYSTEM

BACKGROUND OF THE INVENTION

Field of the Invention

One or more embodiments of the invention are related to the fields of computer security systems. More particularly, but not by way of limitation, one or more embodiments of the invention enable a malware beacon detection system.

Description of the Related Art

Malware is one of the most common security threats that organizations are concerned about, with more than a billion malware in existence. A malware may be any piece of malicious software that intends to cause damage by disrupting operations, stealing credentials, leaking sensitive data, encrypting files, using system resources to launch attacks on other systems, or simply denying users access to critical files and functions.

Malware can enter a system through various means. It could be via a link that a user clicked, an email attachment, an infected USB device, as an add-on with software downloaded from untrusted websites, or via an infected resource shared on the network or a compromised website. And infections are not limited to computer systems—mobile phones and IoT devices can be infected and act as an active carrier as well.

With the immense threat that malwares pose, it is important to detect any malware in a timely manner. However, malwares are designed to evade cybersecurity defenses. The most common malware detection technology is an antivirus. Antivirus and similar technology focus on malware detection by matching signature patterns of known malware. However, this poses an obvious problem of not being able to detect any malware which has not been discovered or whose signature patterns are not yet generated.

In order to overcome this shortcoming, security devices attempt to detect any behavior associated with malware, like monitoring for connections to IP addresses known to be associated with malware or interacting with programs commonly accessed by malware. However, none of these detection techniques are foolproof. There are no known security systems that are able to effectively detect malware without knowledge of malware signatures or of known addresses with which malware communications.

For at least the limitations described above there is a need for a malware beacon detection system.

BRIEF SUMMARY OF THE INVENTION

One or more embodiments described in the specification are related to a malware beacon detection system. Embodiments of the invention may analyze message logs to detect patterns suggestive of malware, such as periodic messages of similar size.

One or more embodiments of the invention may have a processor that is configured to receive message logs, where each message log includes a source, a destination, a timestamp, and a message length. The processor may group the message logs into one or more communication pair groups, where each of these groups contains message logs having the same source and the same destination. For each group, the processor may calculate a message interval series as differences between timestamps associated with successive message logs in the group, and a message length series with the message length for each message log in the group. It may calculate a periodicity score that measures how closely the message interval series conforms to a periodic sequence, and a length uniformity score that measure how closely the message length series conforms to a constant sequence. It may calculate a malware beacon risk score based on the periodicity score and on the length uniformity score.

In one or more embodiments the processor may also be configured to remove outliers from the message interval series and from the message length series before calculating the periodicity score and the length uniformity score.

In one or more embodiments the periodicity score may be the entropy of the message interval series.

In one or more embodiments the length uniformity score may be the entropy of the message length series.

In one or more embodiments calculating the periodicity score may include calculating a degree to which the message interval series repeats according to a period greater than or equal to one and less than or equal to half of the length of the message interval series. Calculating the degree to which the message interval series repeats according to a period may include partitioning the message interval series into subsequences of length equal to the period, calculating a subsequence sum series as the sum of each subsequence, and calculating a measure of how closely the subsequence sum series conforms to a constant sequence. The measure of how closely the subsequence sum series conforms to a constant sequence may be the entropy of the subsequence sum series.

In one or more embodiments the malware beacon risk score may also be based on the duration of communications between the source and the destination.

In one or more embodiments the malware beacon risk score may also be based on a threat assessment score assigned to one or both of the source and the destination.

In one or more embodiments the malware beacon risk score may also be based on the size of one or more messages between the source and the destination.

In one or more embodiments the malware beacon risk score may also be based on whether communication between the source and the destination is detected on multiple systems.

In one or more embodiments the malware beacon risk score may also be based on a request method utilized in communication between the source and the destination.

In one or more embodiments the malware beacon risk score may also be based on a resource type accessed in communication between the source and the destination.

In one or more embodiments the processor may also be configured to perform one or more automated response actions based on the malware beacon risk score to eliminate or mitigate a malware threat. For example, automated response actions may include one or more of blocking outbound traffic on network devices, isolating an endpoint on a network, launching a system scan, and adding assets to a watchlist.

BRIEF DESCRIPTION OF THE DRAWINGS

The above and other aspects, features and advantages of the invention will be more apparent from the following more particular description thereof, presented in conjunction with the following drawings wherein:

FIG. 2 shows an embodiment of the invention that analyzes a communications log to look for periodic and similar-sized messages between a specific source and a specific destination to identify possible malware.

FIG. 3A shows illustrative steps performed by one or more embodiments of the invention to detect potential malware.

FIG. 4 illustrates the preliminary steps of the flowchart of FIG. 3A applied to the communications log of FIG. 2.

DETAILED DESCRIPTION OF THE INVENTION

A malware beacon detection system will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
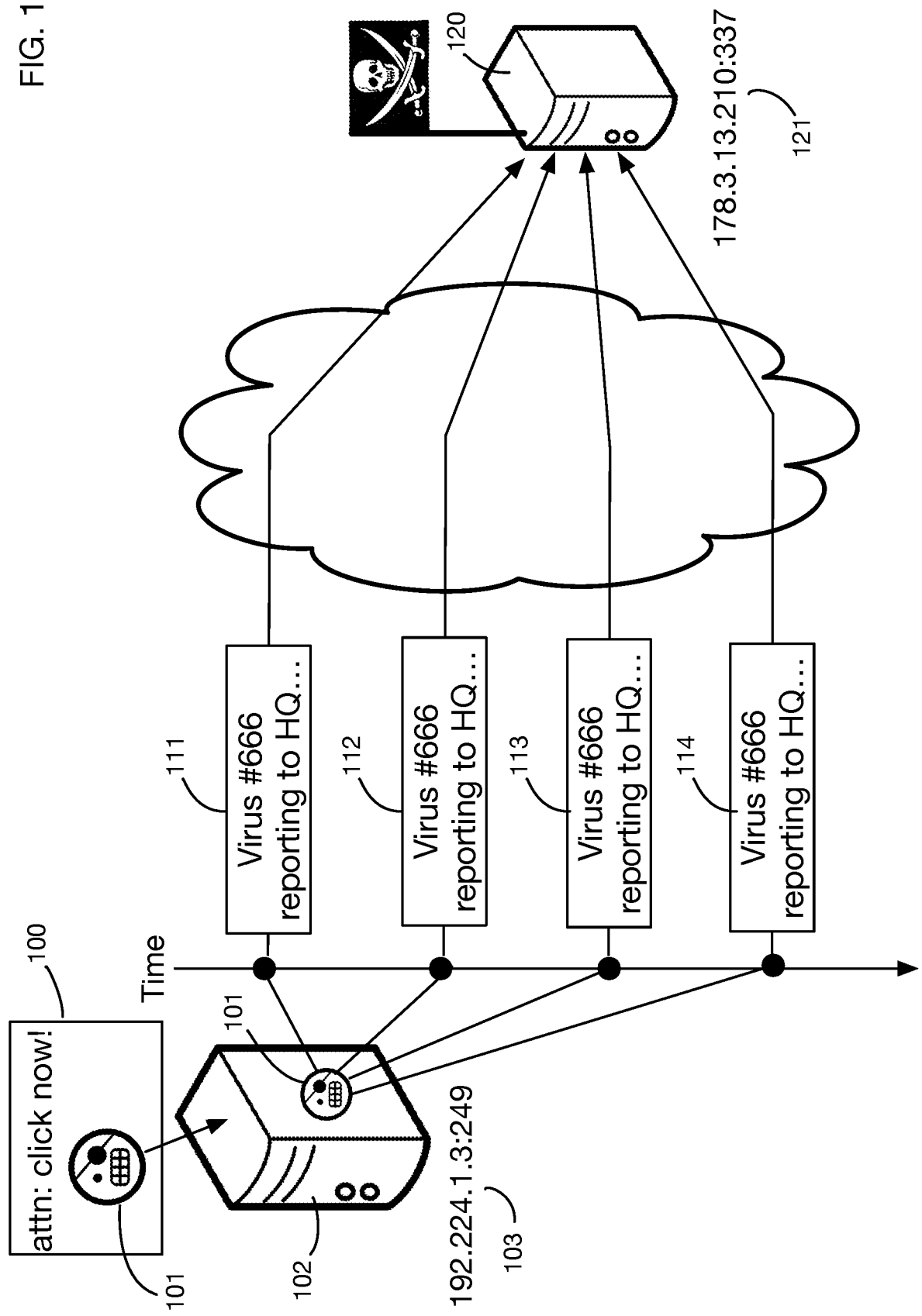
FIG. 1 shows a typical scenario of malware covertly installing itself onto a system and then periodically transmitting beacon messages to a command-and-control center; embodiments of the invention may look for this pattern of behavior to detect malware.

FIG. 1 shows an illustrative scenario of malware 101 entering and infecting a system 102. For example, malware 101 may be embedded in an email or other message 100, or it may enter system 102 a link that a user clicked, an email attachment, an infected USB device, as an add-on with software downloaded from untrusted websites, or via an infected resource shared on the network or a compromised website. System 102 may be a computer system or systems, a mobile phone, an IoT device, or any other device into which malware 102 may enter and affect the system's behavior.

One of the first behaviors often exhibited by a malware infection is communication with a Command and Control (CnC) system. Command and Control systems, as the name implies, are used by attackers to remotely control the systems compromised by malware and pass on instructions to them. A malware tends to send 'beacon signals' to CnC systems to let the attackers know that a system has been compromised and is ready to receive further instructions. For example, after infecting system 102 malware 101 transmits beacon messages 111, 112, 113, 114, etc. to command-and-control system 120. These messages are typically sent at regular intervals, and each beacon message is generally similar in length and content to the other beacon messages. One or more embodiments of the invention may use this typical signature of periodic and similar length messages to identify potential malware beacons.

A challenge in detecting these malware signatures is that these beacon signals are mixed in with regular communication, making it extremely difficult to spot them. The example in FIG. 1 shows only the messages sent from the malware's address 103 to the command-and-control system's address 121. FIG. 2 shows a more realistic example with a communication log 201 containing information on all messages sent from (or to) system (or systems) 102. Logs 201 may contain any information about message traffic involving system 102; typical data logged for each message may include for example a timestamp 201a, a message source 201b, a message destination 201c, and a message length 201d. The data in a message log may be in any units and at any level of granularity or precision. For example, the timestamp 201a may be milliseconds, seconds, minutes, hours, or days measured from some reference point in time; source 201b and destination 201c may be for example an IP address and port, a domain name, a process id, a user agent id, or any other data that identifies a sender and a receiver; message length 201d may be the length of message in bytes, kilobytes, megabytes, or any other unit, and it may or may not include data such as headers or checksums. A "message" associated with a message log may be a packet, a datagram, an email, a session, or any other unit of communication. The message logs in table 201 are ordered by timestamp, so traffic between different sources and destinations is interleaved.

To detect the signature of a malware beacon in communication log 201, one or more embodiments of the invention may analyze the log with a system 202, which may be any processor, including for example, without limitation, any computer, server, processor, or network of multiple systems. The system 202 that analyzes the log 201 may be the same as or different from the system 102 that is being analyzed for the possible presence of malware. In one or more embodiments the log 201 may contain communication logs for several systems, and the analysis may search for malware signatures on any of these systems.

FIG. 2 shows an overview of illustrative steps that system 202 may take to analyze message logs to detect malware; subsequent figures show these steps in greater detail. First, system 202 groups the message logs 201 by the combination of source and destination. This results in four groups 221, 222, 223, and 224. Then the message timestamps of each group are analyzed for a pattern suggesting periodicity, and the message lengths of each group are analyzed for a pattern suggesting similar-sized messages. Analyzing for periodicity and message length similarity may identify beacon traffic potentially associated with malware and separate it from regular, benign connections. Since a beacon signal is used as a notification to an attacker, it typically tends to have some periodicity. Additionally, beacon signals, especially in the early stages, also tend to have similar-sized packets as the data contained in them is consistent. In the example in FIG. 2, the timestamps 211 of successive messages in group 221 show periodic transmissions, and the message lengths 212 of these messages show similar-sized messages. These patterns are not present for groups 222, 223, and 224. This analysis implies conclusion 230 that the source (sender) in group 221 is a high risk for malware. Because of this high malware risk score 230, the system 202 (or other security systems that communicate with system 202) may automatically perform certain responses, such as action 231 to block traffic from the suspected malware source or to the suspected malware destination (or both), for example by modifying firewall rules.

FIG. 3A shows a flowchart of illustrative steps that may be performed by an analysis system 202 to detect a malware beacon. One or more embodiments may use a subset of these steps, or may use additional steps, or may perform steps in any order. In step 301 the system receives or obtains message logs of messages sent from (or to) the system or systems being analyzed. These logs may contain data such as a timestamp, a source, a destination, and a message length; additional message information may be present in some message logs that may also be analyzed in one or more embodiments. In step 302, the message logs are grouped by communication pairs that consist of unique combinations of source and destination. The type of source/destination pairs that are used for grouping the message logs may depend on the type of message logs. For example, for network logs from devices like firewall and routers, a communication pair may consist of <Source IP, Source Port, Destination IP, Destination Port>. For web proxy logs, a communication pair may consist of <Source IP, Destination URL or Destination Hostname, Destination Port>. For DNS logs, a communication pair may consist of <Source IP, Destination Domain>. Any method of identifying unique communication pairs that combine a source and destination may be used in one or more embodiments of the invention. The source and the destination may be identified at any desired level of granularity, such as a subnetwork, system, domain, process, port, or any combination thereof.

Steps 303 are then performed for each communication pair group (unique combination of source and destination) identified in step 302. The message logs associated with each group are analyzed for signatures of periodicity and message length uniformity. For periodicity, step 311 may calculate a message interval series from the message logs of the group. This series may contain timestamp differences between successive message logs in the group. Calculating these time differences may simplify detection of periodicity, for example. For example, the message logs associated with the group may be sorted by timestamp (within the group), and the interval series may be calculated as the first difference of the timestamp series. Step 312 may optionally filter the interval series using any desired algorithm. For example, in one or more embodiments step 312 may remove outliers from the interval series. An illustrative method of removing outliers is to remove any value that is more than 1.5 times the interquartile range above the third quartile or below the first quartile. Any method of filtering out outliers may be used in one or more embodiments. Any other filtering steps may be applied, such as smoothing, quantizing, rounding, rescaling, grouping, or categorizing. Step 313 then calculates a periodicity score based on the (possibly filtered) interval series. This periodicity score measures how closely the data conforms to a periodic series of messages (within the group). An illustrative method of measuring periodicity using entropy is described below.

For message length uniformity, step 321 may calculate a message length series from the message logs of the group. Message lengths may be available directly from the logs, or they may be calculated from other log data. Step 322 may optionally filter the length series using any desired algorithm. For example, in one or more embodiments step 322 may remove outliers from the length series. An illustrative method of removing outliers is to remove any value that is more than 1.5 times the interquartile range above the third quartile or below the first quartile. Any method of filtering out outliers may be used in one or more embodiments. Any other filtering steps may be applied, such as smoothing, quantizing, rounding, rescaling, grouping, or categorizing. Step 323 then calculates a length uniformity score based on the (possibly filtered) length series. This length uniformity score measures how closely the data conforms to a series of messages of constant length (within the group). An illustrative method of measuring length uniformity using entropy is described below.

In step 330, a malware risk score is calculated based on the periodicity score from step 313 and based on the length uniformity score from step 323. A malware risk score may be any function of these periodicity and length uniformity scores; for example, without limitation, it may be a sum, average, maximum, or a categorical score based on thresholds for either or both of the periodicity and length uniformity scores. A malware risk score is associated with each communication pair (source and destination combination). A high malware risk score may suggest for example that the source of the communication pair is malware, and that the destination is a command-and-control system for the malware. A malware risk score may be qualitative (such as a rating of High, Medium, or Low), or quantitative (such as a numerical value between 1 and 100, for example). It may also be interpreted as a "confidence score" that measures the degree of confidence (qualitatively or quantitatively) that the communication pair represents malware.

Based on the malware risk score calculated in step 330, the system may perform one or more actions to mitigate or eliminate the potential threat. For example, step 341 may perform one or more automated response actions. This step may be performed by the analysis system that identifies the potential malware, or by another system that is coupled to the analysis system. Response actions may be triggered based on the risk score assigned to the detection. The scores may for example be categorized into appropriate ranges and different actions may be configured for each range. Actions may be performed via security technologies such as network firewalls, web proxy, EDR, etc. Illustrative actions that may be performed are described below with respect to FIG. 3B. The system may also perform step 342 to correlate the detected potential malware with other threats or other events. If matches are found between the assets identified by malware risk detection and other assets that are flagged by other security or risk detection systems, the significance of these other threats may be increased, and they may be prioritized better. This functionality may for example be performed using a Security Information and Event Management ("SIEM") system or a Security Orchestration, Automation and Response ("SOAR") system. As an example of threat correlation, if there are alerts related to unauthorized user access for a host that is associated with beacon signals, the malware risk score may be increased since the unauthorized access could be related to the malware.

Figure 3B:
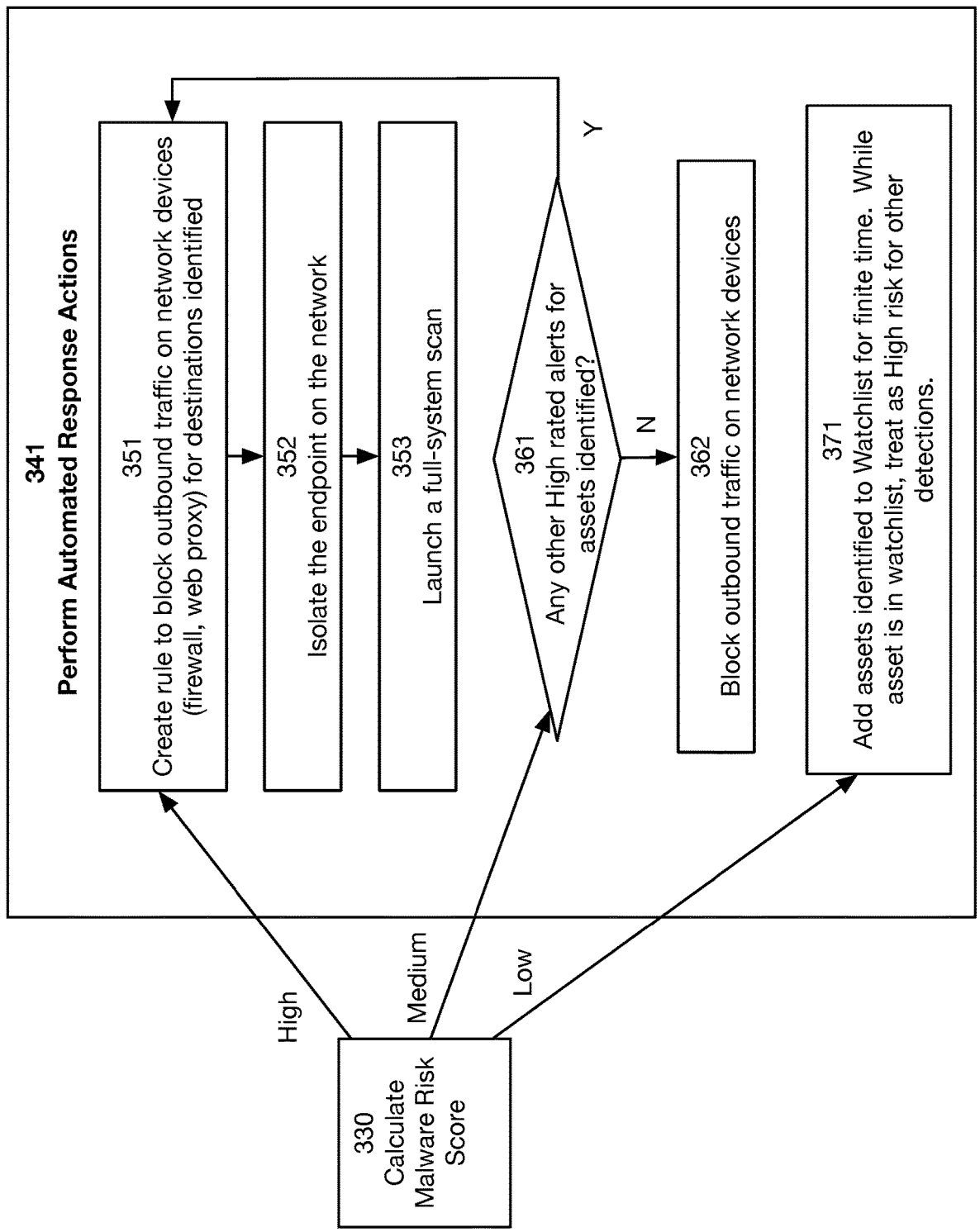
FIG. 3B shows illustrative automated response actions that may be taken in one or more embodiments of the invention based on a malware risk score determined for example as in FIG. 3A.

FIG. 3B shows some illustrative automated response actions that may be performed in one or more embodiments based on the malware risk score calculated in step 330 of FIG. 3A. In this illustrative example, the malware risk score is a qualitative rating of risk into three categories: High, Medium, and Low. Similar automated response actions may be taken for other types of risk scoring and categorization. For High risk scores, the system may for example perform action 351 that creates a rule to block outbound traffic on network devices (via firewalls, web proxies, etc.) for the destinations identified, action 352 to isolate the endpoint on the network, and action 353 to launch a full-system scan. For Medium risk scores, the system may perform check 361 of whether there are any other High rated alerts for the assets identified. If so, the rating of this event may be raised to High and the steps 351, 352, and 353 for High risk scores may be performed; if not, step 362 may be performed to block the outbound traffic on network devices. For Low risk scores, step 371 may add the assets identified to a Watchlist for a finite time period (for example 24 hours). While an asset is in the watchlist, it is treated as a potential high-risk asset for all other detections; thus, if any other detection occurs for the asset, this detection is assigned a risk score of High and actions 351, 352, and 353 will be performed.

The automated response actions shown in FIG. 3B are illustrative; one or more embodiments may perform any automated actions that mitigate or eliminate risks, or that change risk classifications based on other data or sequences of events. Actions may include for example, without limitation, deleting suspicious files or programs, blocking communications, preventing or limiting access to files, databases, or system, changing security privileges, executing additional scans or tests, placing assets on watchlists, and communicating potential risks to staff or other security systems.

FIG. 4 illustrates steps 301, 302, 311, and 321 for the communication log 201 of FIG. 2. System 202 receives this log and first groups the message logs by communication pairs, which in this example consist of pairs containing (source-address: source-port, destination-address: destination: port). For each of the resulting groups 221 through 224, a time difference 401 for each message (except the first message in the group) is calculated by subtracting the message's timestamp from the timestamp of the immediately preceding message (within the group). For each group, a message length series and a message interval series are then extracted for further analysis. For example, for communication pair 411, the length series 412 and the interval series 413 are extracted from the logs in group 221, and for communication pair 421, the length series 422 and the interval series 423 are extracted from the logs in group 222.

As described with respect to FIG. 3A, in one or more embodiments the length series and/or the interval series may be then filtered before analyzing them for uniformity and periodicity, for example by removing outliers. For ease of illustration this optional filtering is not shown in this example.

Figure 5:
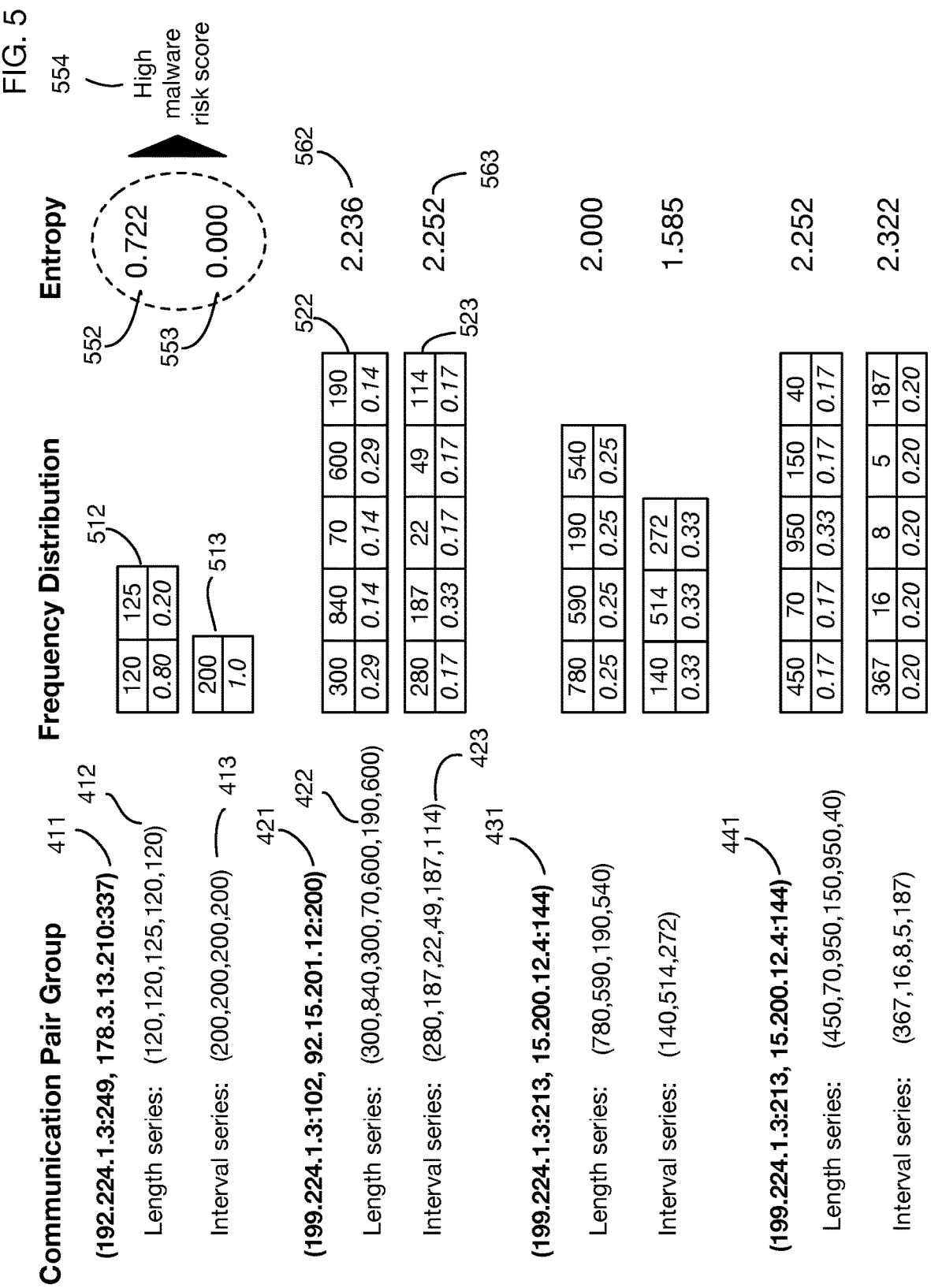
FIG. 5 continues the example of FIG. 4 to show calculation of periodicity and length uniformity scores using entropy measures to identify potential malware.

Steps 313 and 323 are then applied to the interval and length series (for each communication pair group), respectively, to obtain a periodicity score and a length uniformity score. Any desired methods and algorithms may be used to calculate these scores. One approach that may be used in one or more embodiments is to measure periodicity and length uniformity by how concentrated the interval and length values are around a relatively small number of values. An illustrative formula may be based for example on the entropy of the frequency distribution of the interval and length values, as illustrated in FIG. 5. The entropy of a set of values $\{x_i\}$, each having a relative frequency $p_i$ in the related series, may be defined for example as $H=-\Sigma_i p_i \log_2 p_i$. (Any base may be used for the logarithm; FIG. 5 uses base 2 logarithms.) The entropy of a series of completely constant values is 0, and entropy increases as the number of distinct values in the series grows and as the frequency distribution becomes more spread out and more random. A lower entropy suggests a higher uniformity of values, and thus a higher periodicity or length uniformity score. FIG. 5 shows the entropy of the length and interval series for each communication pair group of FIG. 4. For communication pair 411, length series 412 has frequency distribution 512, with entropy 552. The entropy is low because 80% of the values of series 412 are identical. Interval series 413 has frequency distribution 513; the entropy 553 of this distribution is 0, because all values are identical. Because both the length series entropy 552 and the interval series entropy 553 are low, communication pair 411 is assigned a high malware risk score 554. For example, a malware risk score may be calculated as the inverse of the sum of the entropy scores of the length and interval series; any function may be used to assign a malware risk score as a function of the entropies (or other measures of periodicity and length uniformity). The other communication pairs 421, 431, and 441 have higher entropies for the frequency distributions associated with their length and interval series; therefore, they are assigned lower malware risk scores. For example, for communication pair 421 the frequency distribution 522 for the length series 422 shows that this distribution is spread out over five different values, with a corresponding entropy 562 that is considerably higher than the entropies for communication pair 421; the interval series 423 also has a relatively higher entropy 563 associated with its frequency distribution 523. The malware risk score associated with communication pair 421 is therefore lower.

Figure 6:
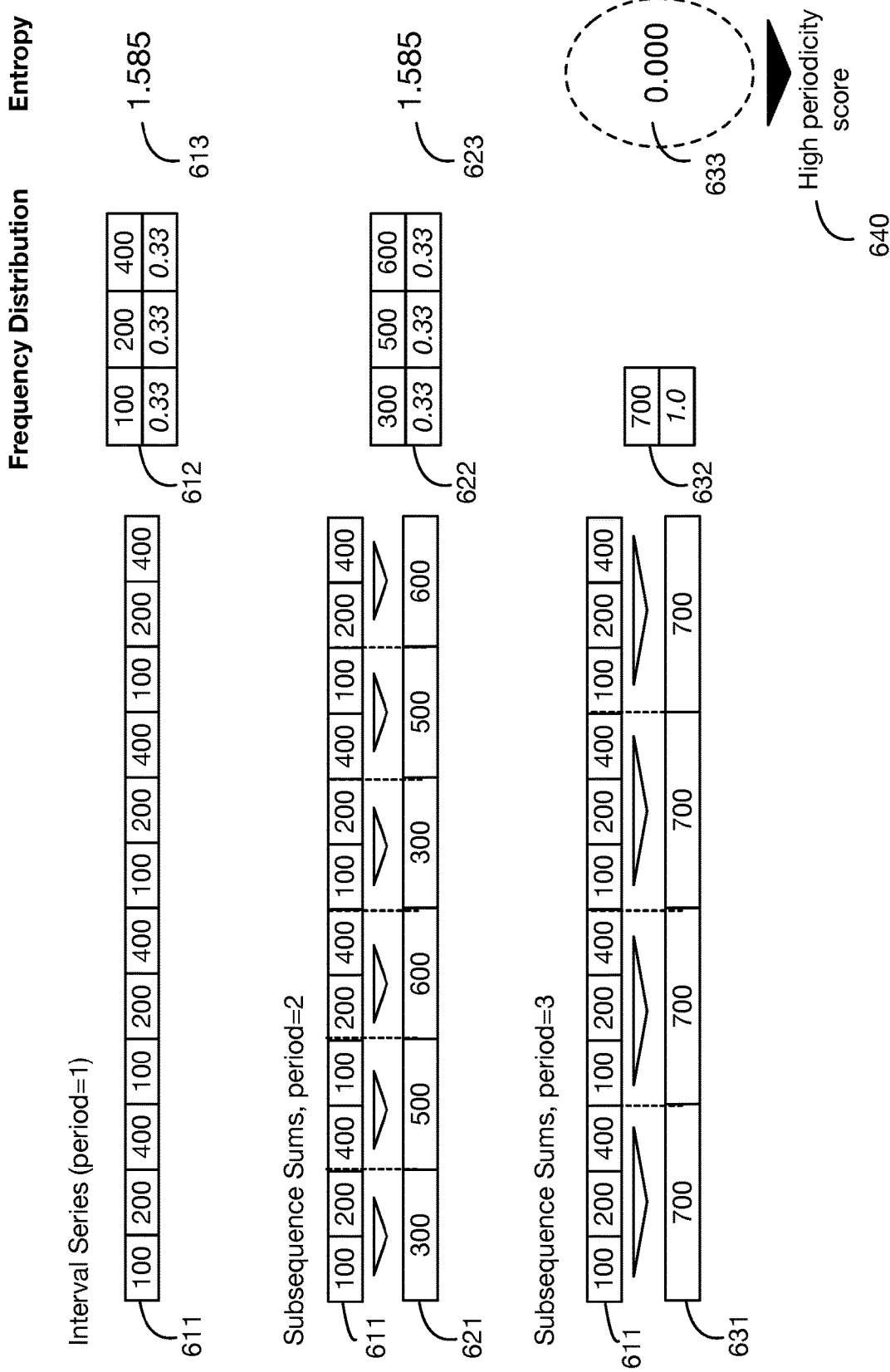
FIG. 6 shows a variation of the periodicity detection method that looks for uniformity of subsequence sums for different length subsequences of inter-message intervals.

Some malware beacons may attempt to disguise their periodicity with more complex communication patterns. FIG. 6 shows an illustrative example of an interval series 611 for a malware beacon. This beacon does not repeat messages at equal intervals, but it does show a periodic pattern: the message intervals repeat every three messages. The interval series 611 is therefore itself periodic with a period of three. To detect this type of periodicity, one or more embodiments of the invention may perform an analysis as shown in FIG. 6, which partitions the message interval series into subsequences of length corresponding to different possible periods, and searches for a period that results in relatively uniform subsequence sums. Entropy may be used as a measure of uniformity, as described above. Possible periods can be checked for any period between 1 and half of the length of the interval series, for example. In the example of FIG. 6, the frequency distribution 612 associated with the original interval series 611 has an associated entropy 613; this entropy is not very low, so it does not suggest uniform intervals at a period of 1 (where subsequences of length 1 correspond to the original series 611). Series 621 shows subsequence sums for a period (subsequence length) of 2; again, the entropy 623 for the corresponding frequency distribution 622 is not low enough to indicate periodicity of period 2. Series 631 shows subsequence sums for a period (subsequence length) of 3; here the entropy 633 for the corresponding frequency distribution 632 is 0, indicating that the interval series is perfectly periodic for a period of 3. (A low but nonzero entropy may also suggest a high likelihood of periodicity at the selected period.) The low entropy 633 for the length 3 subsequence sums therefore implies a high periodicity score 640; this periodicity score may be combined with a length uniformity score to calculate a malware risk score. An illustrative calculation that may be used is to calculate the entropy for subsequence sums at various periods between one and half the interval series length, and to use the minimum of these entropies to calculate a periodicity score.

Figure 7:
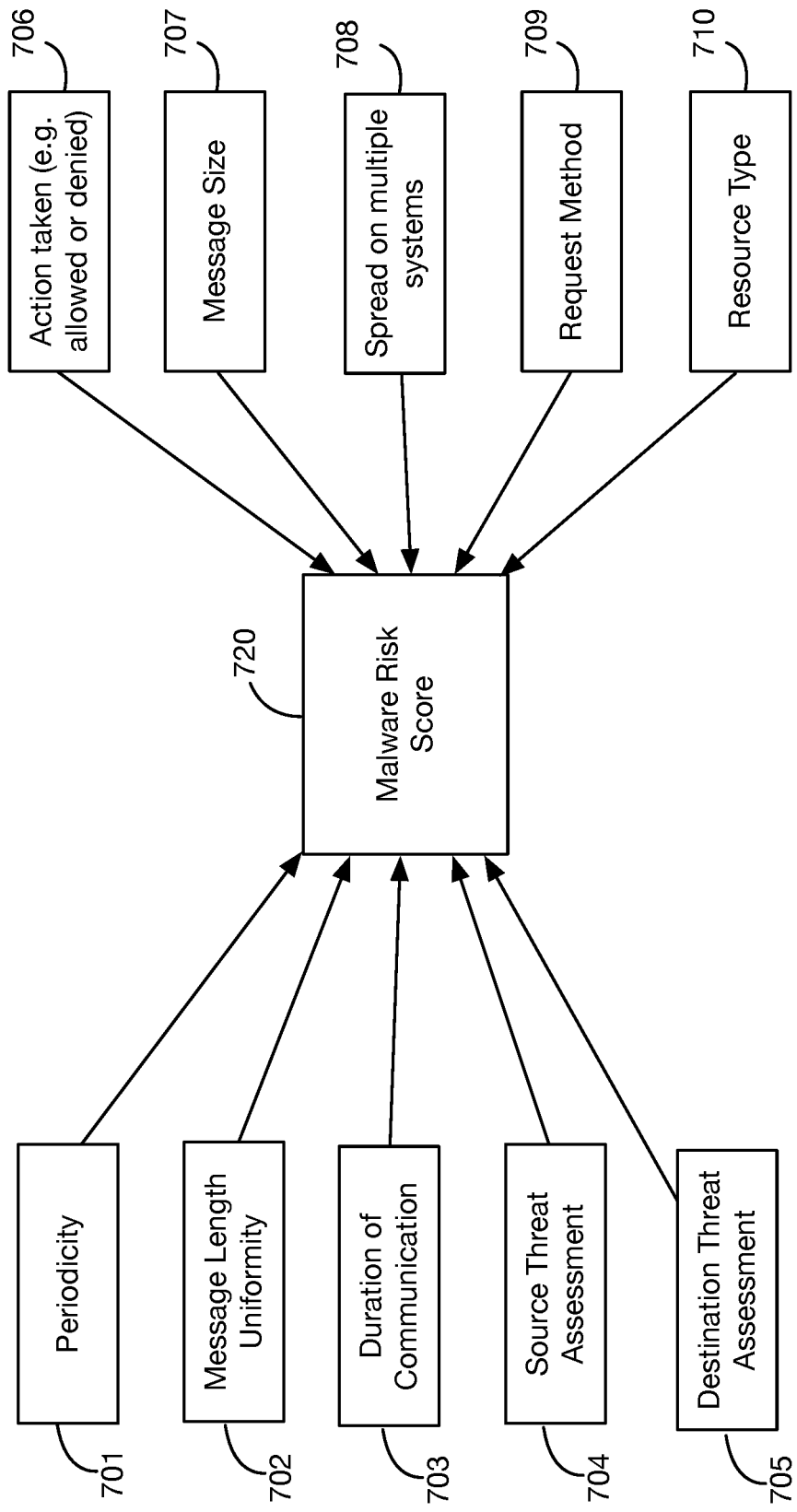
FIG. 7 shows a framework for calculating a malware risk score that includes additional factors beyond those described in FIG. 3A.

In one or more embodiments of the invention, additional factors besides periodicity and length uniformity may be used to assess malware risk. FIG. 7 shows an illustrative framework for factors that may be used to determine a malware risk score 720. Periodicity 701 and message length uniformity 702 may be measured for example as described above. Duration of communication 703 may measure how long communication has been ongoing for a particular communication pair; longer duration may be indicative of a higher malware risk since the malware may repeatedly send messages to its command-and-control system over a long period of time. For example, a beacon activity that persists across multiple days is a sign that the beacon activity is associated with software that persists on the system, and may be a risk, as opposed to a temporary activity associated with a visit to a sports website, for example, that provides live score updates via a beacon-like web request. Factors 704 and 705 may measure whether the source or destination of a communication pair is a known or suspected threat; these threat assessment scores may come from external threat databases, blacklists, or correlation with other security systems' threat reports. Factor 706 may modify the malware risk score depending on whether an action has already been taken to block or remove the suspected malware. This factor may not impact the initial detection score of the beacon activity itself; however, for the purpose of automating response actions, if a communication has been previously allowed, the malware risk score for subsequent communications from the same source may be assigned a higher risk score since it remains a potential risk. Factor 707 may increase the malware risk score if the beacon sends unusually large messages or large packets. This factor is independent of the message length uniformity factor 702, which may assign a high score for uniform messages even if they are short. Very long messages may for example be associated with data exfiltration attempts, so they may increase the malware risk score. Factor 708 may measure whether the suspected beacon activity has been detected on multiple systems; if so, it is a sign of a more widespread infection and it needs appropriate response measures, as opposed to one isolated system being impacted. Factor 709 may assign a higher risk score for certain types of request methods; for example, if a beacon uses POST or PUT methods over HTTP, the beacon connections may be associated with data exfiltration. Factor 710 may assign a higher risk score based on the types of resources a beacon is attempting to access; for example, if beacon connections are attempting to access executable files, they may be attempting to download additional malware that can be used to launch more attacks.

The factors 701 through 710 shown in FIG. 7 are illustrative; one or more embodiments of the invention may use any or all of these factors, as well as any additional factors, to determine a malware risk score for a communication pair.

Figure 8:
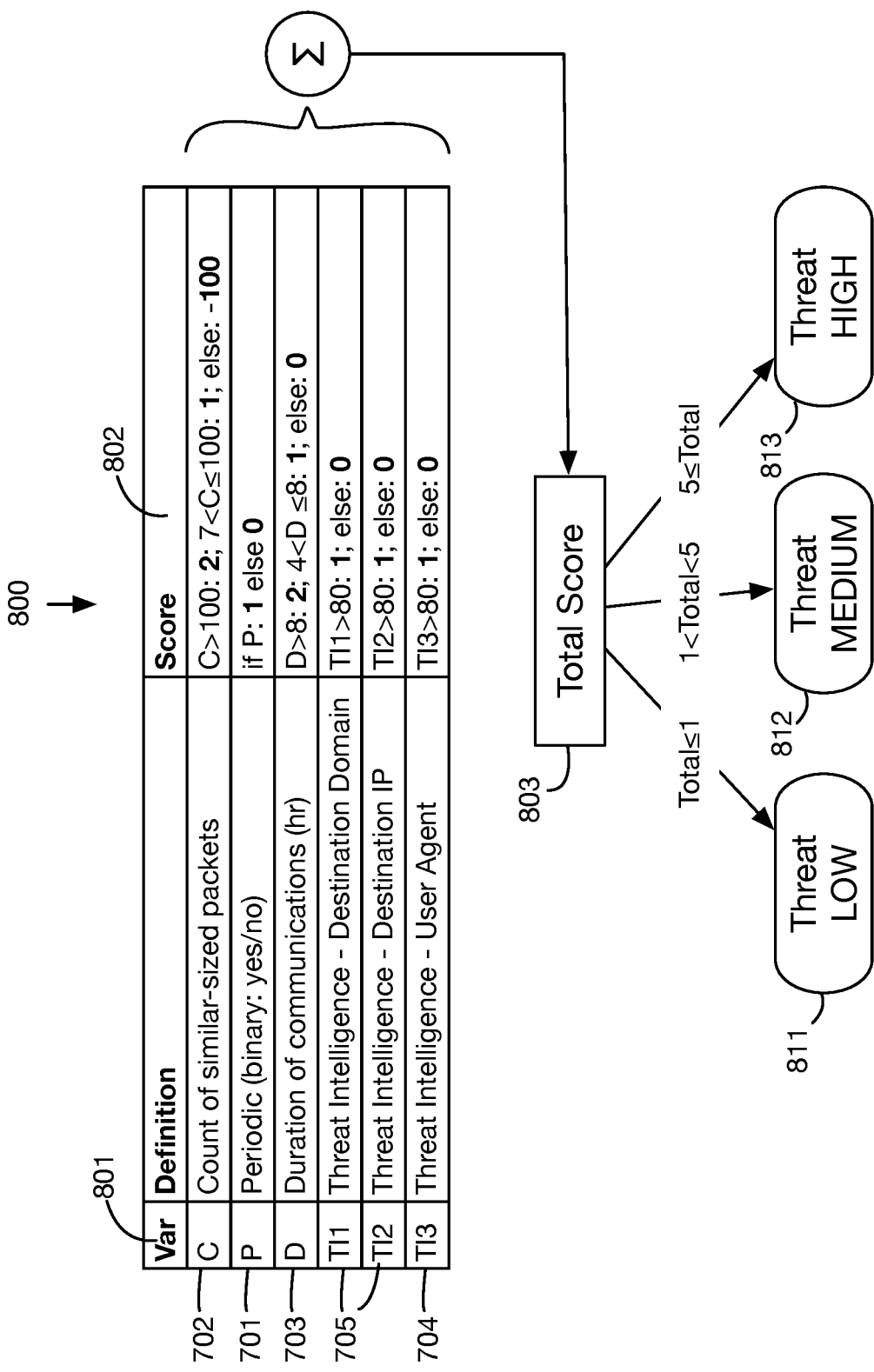
FIG. 8 shows an illustrative risk formula for the factors of FIG. 7 that may be used in one or more embodiments to identify potential malware.

FIG. 8 shows an illustrative formula 800 that combines the factors 701 through 705 of FIG. 7 to calculate a malware risk score. Six variables 801 may be measured, each of which corresponds to one of these factors. For example, a measure of length uniformity 702 may be the count C of similar-sized packets. For each variable, a corresponding factor score 802 may be calculated. The sum 803 of these factor scores may then be used to determine a malware risk score; in this example, the risk score is a ranking of low threat 811, medium threat 812, or high threat 813 based on specific thresholds for the total score 803.

Figure 9:
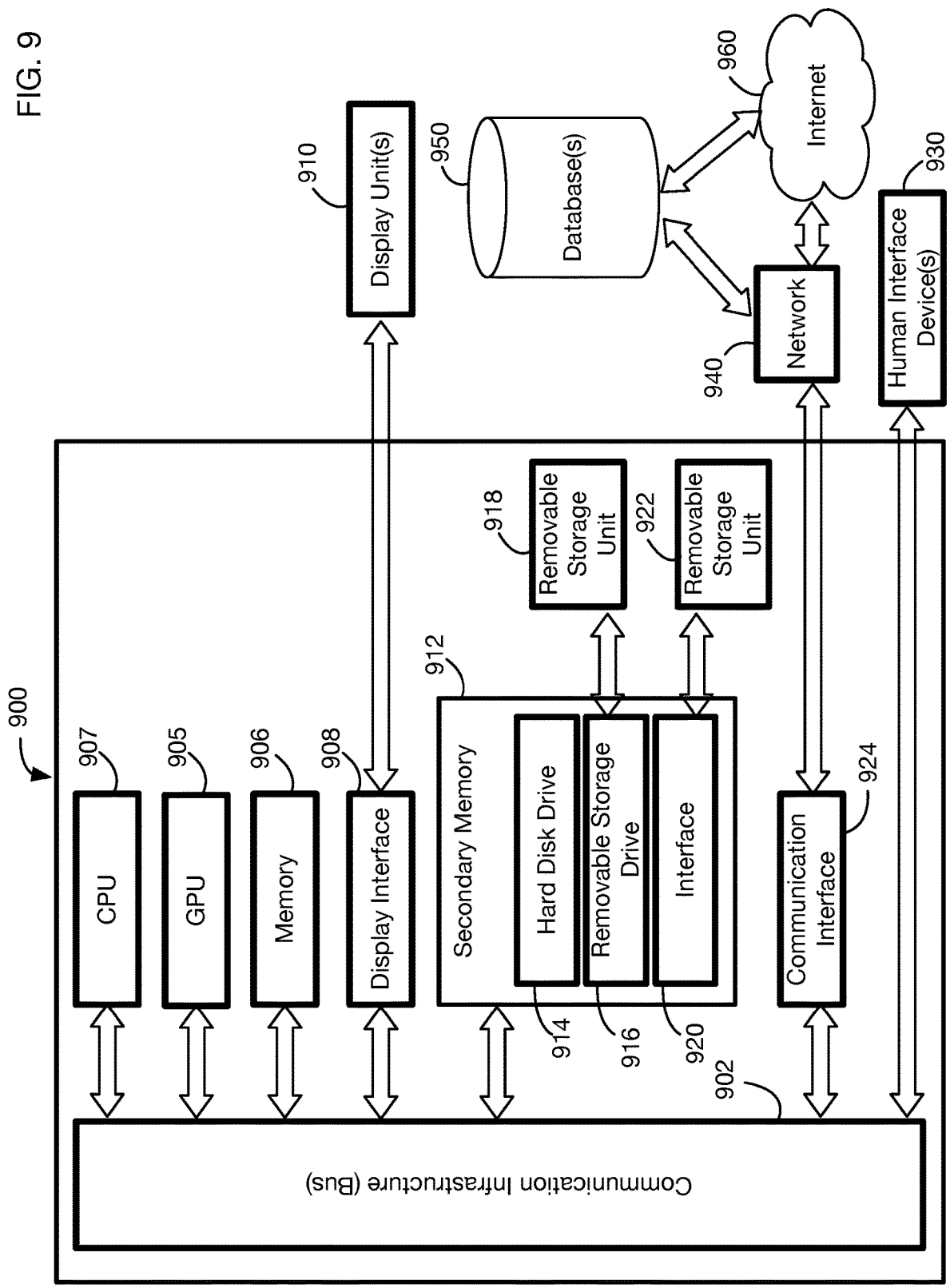
FIG. 9 shows elements of an illustrative computer system that may be used in one or more embodiments to implement the malware detection procedures.

FIG. 9 shows an embodiment of exemplary computer 900 that may be utilized in, by, or as any component in the system. For example, computer 900 or any of its components may be all or part of analysis system 202 that analyzes message logs to determine a malware risk. In one or more embodiments, computer 900 may be a network of computers, each of which may have any or all of the components shown in FIG. 9. In one or more embodiments, computer or computers 900 may also be utilized to implement any function in the system, i.e., any step or act or function that executes in any computer or server or engine in the system. Computer 900 may include processor CPU 907 that executes software instructions specifically tailored to the respective functions of embodiments of the invention. The software instructions, otherwise known as computer program instructions, may reside within memory 906. Computer 900 may include processor GPU 905, which may execute graphics instructions or other instructions for highly parallel operations, for example. GPU program instructions may also reside within memory 906. Computer 900 may include display interface 908, which may drive display unit or units 910 of any computer in the system as desired. Some computers 900 may or may not utilize a display. Computer 900 may include communication interface 924, which may include wireless or wired communications hardware protocol chips. In one or more embodiments of the invention communication interface 924 may include telephonic and/or data communications hardware. In one or more embodiments communication interface 924 may include a Wi-Fi™ and/or BLUETOOTH™ wireless communications interface. Any wireless network protocol or type may be utilized in embodiments of the invention. CPU 907, GPU 905, memory 906, display interface 908, communication interface 924, human interface devices 930, secondary memory 912, such as hard disk 914, removable storage 916, secondary memory interface 920 and removable storage units 918 and 922 may communicate with one another over communication infrastructure 902, which is commonly known as a "bus". Communications interface 924 may communicate over any wired or wireless medium that allows for communication with other wired or wireless devices over network 940. Network 940 may communicate with Internet 960 and/or database or databases 950. Database 950 may be utilized to implement any database described herein.

While the invention herein disclosed has been described by means of specific embodiments and applications thereof, numerous modifications and variations could be made thereto by those skilled in the art without departing from the scope of the invention set forth in the claims.

What is claimed is:

1. A malware beacon detection system comprising:
   a memory comprising software instructions; and,
   a computer or a server comprising a processor that executes said software instructions configured to
   receive a multiplicity of message logs, each message log of said multiplicity of message logs comprising
   a source;
   a destination;
   a timestamp; and
   a message length;
   group said multiplicity of message logs into at least one communication pair group, wherein each communication pair group of said at least one communication pair group comprises message logs of said multiplicity of message logs having a same source and a same destination;
   for each of said at least one communication pair group
   calculate a message interval series comprising differences between said timestamp associated with successive message logs in each of said at least one communication pair group;
   calculate a message length series comprising said message length for each message log in each of said at least one communication pair group;

calculate a length uniformity score that measures how closely said message length series conforms to a constant sequence;

for each period greater than or equal to one message interval and less than or equal to half of a length of said message interval series,
partition said message interval series into subsequences of length equal to said each period;
calculate a subsequence sum series comprising a sum of each subsequence of said subsequences;
calculate an entropy of said subsequence sum series;

calculate a periodicity score as a minimum entropy of said subsequence sum series across said each period greater than or equal to one message interval and less than or equal to said half of the length of said message interval series; and calculate a malware beacon risk score as a function of said periodicity score and on said length uniformity score,
wherein said malware beacon risk score is a quantitative or qualitative ranking comprising a range of low threat, medium threat and high threat; and, perform one or more automated response actions that is triggered based on said malware beacon risk score to eliminate or mitigate a malware threat,
wherein said one or more automated response actions are performed dependent on whether said malware beacon risk score is ranked as said low threat, said medium threat or said high threat, such that each automated response action of said one or more automated response actions is different and configured for each of said low threat, said medium threat and said high threat.

2. The malware beacon detection system of claim 1, wherein said processor is further configured to remove outliers from said message interval series and from said message length series before calculating said periodicity score and said length uniformity score.

3. The malware beacon detection system of claim 1, wherein said periodicity score comprises an entropy of said message interval series.

4. The malware beacon detection system of claim 1, wherein said length uniformity score comprises an entropy of said message length series.

5. The malware beacon detection system of claim 1, wherein said periodicity score comprises a degree to which said message interval series repeats.

6. The malware beacon detection system of claim 5, wherein said degree to which said message interval series repeats according to said period is calculated by
calculating said degree to which said message interval series repeats according to said period as a measure of how closely said subsequence sum series conforms to said constant sequence.

7. The malware beacon detection system of claim 6, wherein said measure of how closely said subsequence sum series conforms to said constant sequence comprises an entropy of said subsequence sum series.

8. The malware beacon detection system of claim 1, wherein said malware beacon risk score is further based on a duration of communications between said source and said destination.

9. The malware beacon detection system of claim 1, wherein said malware beacon risk score is further based on a threat assessment score assigned to one or both of said source and said destination.

10. The malware beacon detection system of claim 1, wherein said malware beacon risk score is further based on a size of one or more messages between said source and said destination.

11. The malware beacon detection system of claim 1, wherein said malware beacon risk score is further based on whether communication between said source and said destination is detected on multiple systems.

12. The malware beacon detection system of claim 1, wherein said malware beacon risk score is further based on a request method utilized in communication between said source and said destination.

13. The malware beacon detection system of claim 1, wherein said malware beacon risk score is further based on a resource type accessed in communication between said source and said destination.

14. The malware beacon detection system of claim 1, wherein said one or more automated response actions comprise one or more of blocking outbound traffic on network devices, isolating an endpoint on a network, launching a system scan, and adding assets to a watchlist.

15. A malware beacon detection system comprising:
a memory comprising software instructions; and,
a computer or a server comprising a processor that executes said software instructions configured to
receive a multiplicity of message logs, each message log of said multiplicity of message logs comprising
a source;
a destination;
a timestamp; and
a message length;
group said multiplicity of message logs into at least one communication pair group, wherein each communication pair group of said at least one communication pair group comprises message logs of said multiplicity of message logs having a same source and a same destination;
for each communication pair group,
calculate
a message interval series comprising differences between said timestamp associated with successive message logs in each of said at least one communication pair group;
a message length series comprising said message length for each message log in each of said at least one communication pair group;
remove outliers from said message interval series and from said message length series;
for each period greater than or equal to one message interval and less than or equal to half of a length of said message interval series,
partition said message interval series into subsequences of length equal to said each period;
calculate a subsequence sum series comprising a sum of each subsequence of said subsequences;
calculate an entropy of said subsequence sum series;
calculate a periodicity score as a minimum entropy of said subsequence sum series across said each period greater than or equal to one message interval and less than or equal to said half of the length of said message interval series;

calculate a length uniformity score based on an entropy of said message length series;
calculate a malware beacon risk score as a function of
said periodicity score;
said length uniformity score;
a duration of communications between said source and said destination; and
a threat assessment score assigned to one or both of said source and said destination, wherein said malware beacon risk score is a quantitative or qualitative ranking comprising a range of low threat, medium threat and high threat; and,
perform one or more automated response actions that is triggered based on said malware beacon risk score to eliminate or mitigate a malware threat,
wherein said one or more automated response actions are performed dependent on whether said malware beacon risk score is ranked as said low threat, said medium threat or said high threat, such that each automated response action of said one or more automated response actions is different and configured for each of said low threat, said medium threat and said high threat.

* * * * *